United States Patent
Shingai et al.

(10) Patent No.: US 7,524,548 B2
(45) Date of Patent: Apr. 28, 2009

(54) OPTICAL RECORDING MEDIUM

(75) Inventors: Hiroshi Shingai, Tokyo (JP); Hironori Kakiuchi, Tokyo (JP); Hideaki Miura, Tokyo (JP); Kenji Yamaga, Tokyo (JP)

(73) Assignee: TDK Corporation, Tokyo (JP)

( * ) Notice: Subject to any disclaimer, the term of this patent is extended or adjusted under 35 U.S.C. 154(b) by 474 days.

(21) Appl. No.: 11/234,182

(22) Filed: Sep. 26, 2005

(65) Prior Publication Data

US 2006/0078708 A1    Apr. 13, 2006

(30) Foreign Application Priority Data

Sep. 29, 2004    (JP) .............................. 2004-283670

(51) Int. Cl.
   *B32B 3/02*    (2006.01)
(52) U.S. Cl. ................. 428/64.4; 428/64.5; 430/270.13
(58) Field of Classification Search ................ 428/64.5, 428/64.6; 430/270.13
   See application file for complete search history.

(56) References Cited

U.S. PATENT DOCUMENTS

| 5,254,382 | A | * | 10/1993 | Ueno et al. | ................ | 428/64.5 |
|---|---|---|---|---|---|---|
| 6,096,399 | A | | 8/2000 | Yoshinari et al. | | |
| 6,403,193 | B1 | | 6/2002 | Shingai et al. | | |
| 6,605,328 | B2 | | 8/2003 | Shingai et al. | | |
| 6,790,592 | B2 | * | 9/2004 | Harigaya et al. | ....... | 430/270.13 |
| 2002/0012305 | A1 | | 1/2002 | Shingai et al. | | |
| 2006/0068152 | A1 | | 3/2006 | Shingai et al. | | |
| 2007/0025192 | A1 | * | 2/2007 | Shingai | ......................... | 369/1 |

FOREIGN PATENT DOCUMENTS

| JP | 60-226037 | 11/1985 |
|---|---|---|
| JP | 2000-322740 | 11/2000 |
| JP | 2003-288737 | 10/2003 |
| JP | 2003-341240 | 12/2003 |
| JP | 2004-195742 | 7/2004 |
| JP | 2004-224041 | 8/2004 |
| JP | 2006-95845 | 4/2006 |
| WO | WO 9906220 A1 * | 2/1999 |

OTHER PUBLICATIONS

U.S. Appl. No. 11/234,182, filed Sep. 26, 2005, Shingai et al.

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

The optical recording medium is an optical recording medium having at least one information layer including a recording film, characterized in that the recording film is formed by a phase change material including at least Sb, Ge and Mg as main components.

14 Claims, 1 Drawing Sheet

OPTICAL RECORDING MEDIUM

BACKGROUND OF THE INVENTION

The present invention relates to an optical recording medium and in particular to an optical recording medium excellent in the repetitive overwrite characteristic.

Optical recording media such as CDs and DVDs have been in widespread use as recording media for recording digital data.

As the data recording system for optical recording media, in general, data to be recorded is modulated to a predetermined length as a recording mark formed along a track provided on an optical recording medium. For example, on a DVD-RW as a type of an optical recording medium that allows data overwriting by the user, recording marks corresponding to 3T through 11T or 14T (T representing one clock cycle) are used and such a mark is formed onto a recording film included in an information layer along a track provided on the optical recording medium, thereby recording data.

In this way, in case data is recorded by forming recording marks onto a recording film included in an information layer of a data rewritable optical recording medium, a laser beam is irradiated onto a recording film along a track provided on the optical recording medium. In this process, a phase change material in crystalline state included in the recording film turns into an amorphous state thus forming an amorphous area having a predetermined length onto the recording area. The amorphous area thus formed is used as a recording mark.

That is, in case data is recorded onto a recording film included in an information layer of a data rewritable optical recording medium, a laser beam having a power set to a writing power Pw at a sufficiently high recording level is irradiated onto the recording film. An area of the recording film where the laser beam is irradiated is headed above the melting point of a phase change material and thus melts. Next, a laser beam having a power set to a base power Pb at a sufficiently low level is irradiated onto the recording film, which rapidly cools the melted area. As a result, the phase change material included in the area of the recording film changes from the crystalline state to the amorphous state, and a recording mark is formed onto the recording film thus recording data.

In case a recording mark formed on the recording film included in the information layer of a data rewritable optical recording medium is to be erased in order to erase data recorded on the recording film, a laser beam having a power set to an erasing power Pw exceeding the base power Pb is irradiated onto the recording film. This heats an area where the recording marks is formed above the crystallization temperature of the phase change material, followed by gradual cooling of the heated area of the recording film. As a result, the phase change material included in the area of the recording film where the recording marks is formed changes from the amorphous state to the crystalline state, the recording marks is erased and data is erased.

Thus, by modulating the power of a laser beam irradiated onto a recording film included in the information layer of a rewritable optical recording medium to one of a plurality of levels corresponding to a writing power Pw, base power Pb and an erasing power Pe, it is possible to form a recording mark onto a recording film for data recording as well as erase the recording marks formed onto the recording film while forming a new recording mark thereon to perform direct overwriting of data using new data.

In this way, in case the data recorded onto a recording film included in the information layer of a rewritable optical recording medium is to be overwritten directly, nit is preferable to rapidly crystallize the phase change material forming a recording mark in the amorphous state to erase the recording mark. To this end, in general, a recording film included in the information layer of a rewritable optical recording medium is formed by a phase change material having a high crystallization velocity. As optical recording media including a recording film formed by a phase change material having a relatively high crystallization velocity, there are known an optical recording medium including a phase change recording film where one or more of the elements including Ag, Au, Cu, Zn, B, Al, Ga, In, Si, Ge, Sn, Pb, N, P, Bi, La, Ce, Gd and This added to an essential element SbTe (refer to JP-A-2000-322740) and an optical recording medium including a recording film represented by a composition formula $Ge_\alpha Sb_\beta$, where $\alpha$ and $\beta$ are atomic ratios, $5 \leq \alpha \leq 40$ and $60 \leq \alpha \leq 95$ (refer to JP-A-2004-195742).

In case data is directly overwritten into a data-recorded area for the first time after the data is recorded onto an optical recording medium described in JP-A-2000-322740 followed by prolonged storage under a high temperature, the resulting jitter is considerably worsened with the storage characteristic degraded excessively.

While the optical recording medium described in JP-A-2004-195742 shows a better storage characteristic than that described in JP-A-2000-322740, it is recently requested that various characteristics of an optical recording medium be improved. In order to fully respond to such requests, it is desired to further upgrade the storage characteristic of an optical recording medium.

In case data is overwritten 1000 times repeatedly onto an optical recording medium described in JP-A-2000-322740 or JP-A-2004-195742, the jitter is worsened thus degrading the repetitive overwriting characteristic.

SUMMARY OF THE INVENTION

Thus, an object of the invention is to provide an optical recording medium excellent in the storage characteristic and the repetitive overwriting characteristic.

In order to attain the foregoing object of the invention, the inventor has found that, after an intensive study, a recording film included in an information layer of an optical recording medium formed by a phase change material including at least Sb, Ge and Mg as main components effectively prevents considerable degradation of jitter obtained when data is directly overwritten into a data-recorded area for the first time after the data recorded on the recording film is stored for a prolonged time under a high temperature, that a sufficiently low noise level and a high carrier-to-noise ratio (C/N) are obtained when data is directly overwritten 10 times repeatedly onto the recording film, and that, in particular, it is possible to effectively prevent the jitter from being worsened even when data is directly overwritten 1000 times repeatedly onto the recording film.

The invention is based on such findings. According to the invention, the object of the invention is an optical recording medium comprising at least one information layer including a recording film, characterized in that the recording film is formed by a phase change material including at least Sb, Ge and Mg as main components.

The phrase "including Sb, Ge and Mg as main components" means that the content as a sum of the content of Sb, content of Ge and content of Mg is the largest among all elements forming the recording film included in the information layer of the optical recording medium.

According to the invention, it is possible to provide an optical recording medium excellent in the storage characteristic and the repetitive overwriting characteristic.

In case the recording film is formed by a phase change material including Sb and Ge, a medium linear velocity defined as a maximum velocity capable of erasing a recording mark formed on the recording film changes greatly with the loadings of Ge. In case the recording film is formed by a phase change material including Sb and Ge as main components, it is possible to effectively prevent the medium linear velocity from being influenced by the loadings of Ge. Thus, according to the invention, it is possible to stably produce an optical recording medium having a desired medium linear velocity.

In this invention, the atomic ratio of Sb, Ge and Mg included as main components in the phase change material preferably satisfies 70 atm %≦Sb≦95 atm %, 0 atm %<Ge<30 atm %, and 0 atm %<Mg<25 atm %, respectively.

In case the atomic ratio of Sb, Ge and Mg included as main components in the phase change material preferably satisfies 70 atm %≦Sb≦95 atm %, 0 atm %<Ge<30 atm %, and 0 atm %<Mg≦25 atm %, respectively, it is possible to further improve the storage characteristic and the repetitive overwriting characteristic.

In this invention, a phase change material including Sb, Ge and Mg as main components may further have another element added.

According to the invention, it is possible to provide an optical recording medium excellent in the storage characteristic and the repetitive overwriting characteristic.

DETAILED DESCRIPTION OF THE PREFERRED EMBODIMENTS

An embodiment of the invention will be detailed based on attached drawings.

Figure 1:
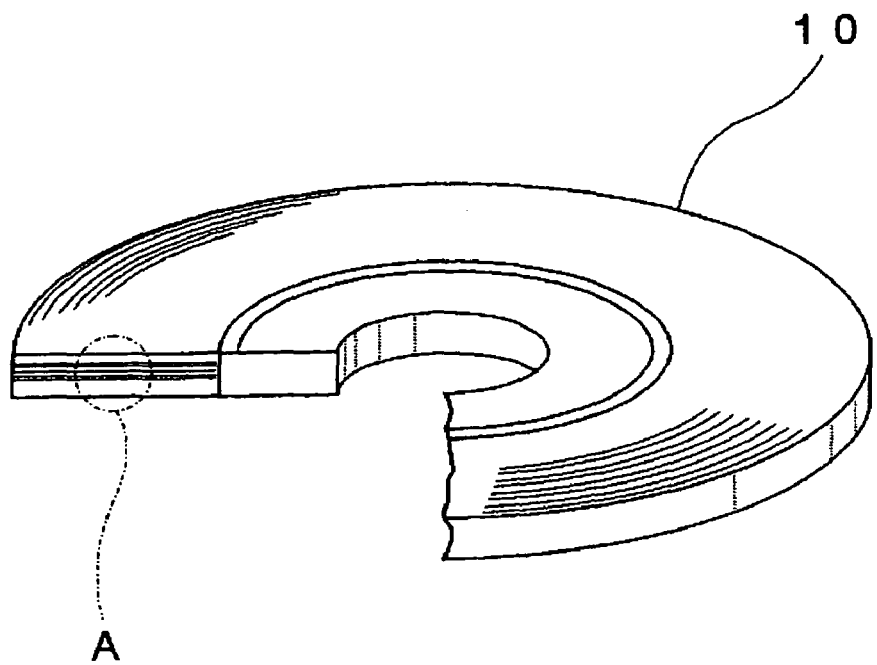
FIG. 1 is a partial cut-out schematic perspective view showing an optical recording medium according to a preferred embodiment of the invention.
Figure 2:
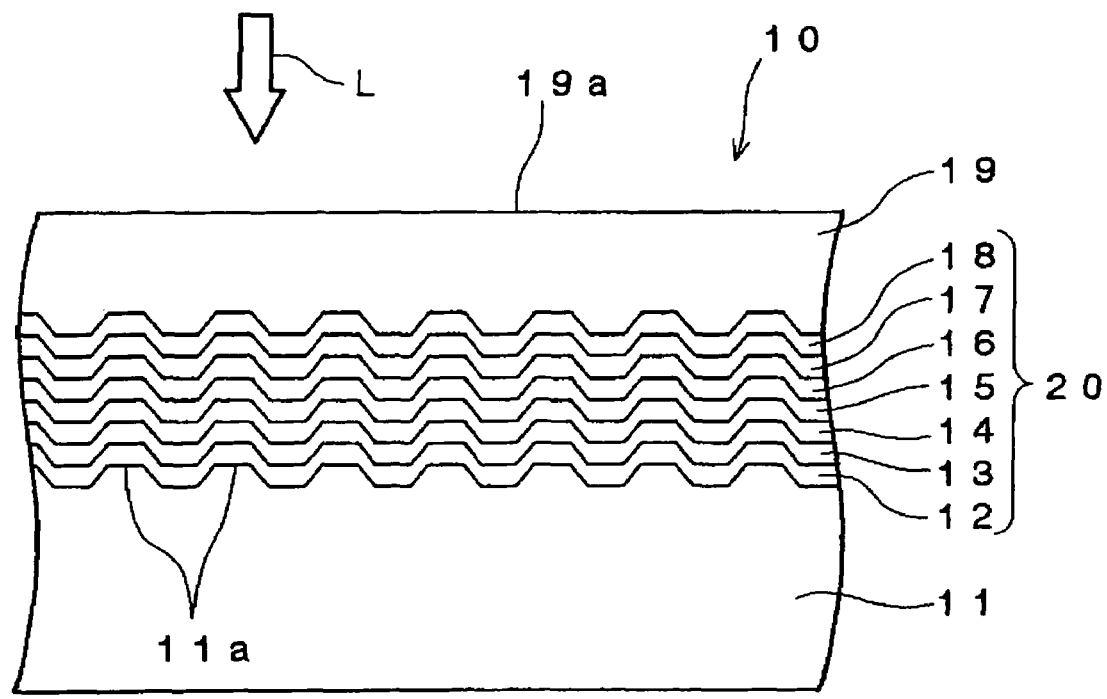
FIG. 2 is a schematic enlarged cross section of the portion indicated by A in FIG. 1.

FIG. 1 is a partial cut-out schematic perspective view showing an optical recording medium according to a preferred embodiment of the invention. FIG. 2 is a schematic enlarged cross section of the portion indicated by A in FIG. 1.

As shown in FIG. 1, an optical recording medium 10 according to this embodiment is formed in the shape of a disc and has an outer diameter of approximately 120 mm and a thickness of approximately 1.2 mm.

The optical recording medium 10 according to this embodiment is arranged as a rewritable optical recording medium. As shown in FIG. 2, the optical recording medium 10 comprises: a support board 11, a fourth dielectric film 12 formed on the surface of the support board 11; a reflective film 13 formed on the surface of the fourth dielectric film 12; a third dielectric film 14 formed on the surface of the reflective film 13; a recording film 15 formed on the surface of the third dielectric film 14; a second dielectric film 16 formed on the surface of the recording film 15; a first dielectric film 17 formed on the surface of the second dielectric film 16; a heat radiation film 18 formed on the surface of the first dielectric film 17; and a light transmissive layer 19 formed on the surface of the heat radiation film 18. One surface of the light transmissive layer 19 forms a plane of incidence 19a where a laser beam is incident. In this embodiment, the fourth dielectric film 12, the reflective film 13, the third dielectric film 13, the recording film 15, the second dielectric film 17, the first dielectric film 17 and the heat radiation film 18 altogether form an information layer 20.

The optical recording medium 10 according to this embodiment is arranged so that a laser beam L having a wavelength λ of 380 nm to 450 nm is irradiated onto the light transmissive layer 19 via an objective lens (not shown) having a numerical aperture NA of approximately 0.85 from a direction indicated by L in FIG. 2.

The support board 11 functions as a support for ensuring a mechanical strength required of the optical recording medium 10.

A material forming the support board 11 is not particularly limited as long as it functions as a support for the optical recording medium 10 although a resin is preferably used. As such a resin, a polycarbonate resin or a polyolefin resin is highly preferable. In this embodiment, the support board 11 is formed by a polycarbonate resin.

In this embodiment, the support board 11 has a thickness of approximately 1.1 mm.

In this embodiment, the laser beam L is irradiated onto the information layer via the light transmissive layer 19 positioned on the opposite side of the support board 11. Thus, it is not particularly necessary that the support board 11 have light transmission property.

As shown in FIG. 2, in the surface of the support board 11 is formed a groove 11a. The groove 11 a acts as a guide track for the laser beam L in case data is recorded/reproduced onto/from the information layer 20.

The support board 11 having the groove 11a in its surface is fabricated for example by way of a molding injection method using for example a stamper (not shown).

The fourth dielectric film 12, together with the reflective film 13 mentioned later, effectively dissipates heat generated on the recording film 15 by the irradiation of the laser beam L.

A material forming the fourth dielectric film 12 is not particularly limited but an oxide, a nitride, a sulfide, a carbide, a fluoride including at least one metal selected from a group formed by Ti, Zr, Hf, Ta, Si, Al, Mg, Y, Ce and Zn or a compound thereof is used. In this embodiment, the fourth dielectric film 12 is formed by a material including zirconium oxide as a main component.

The fourth dielectric film 12 is preferably formed to have a thickness of 3 nm to 40 nm. In case the thickness of the fourth dielectric film 12 is less than 3 nm, the heat dissipation effect drops. In case the thickness of the fourth dielectric film 12 is less than 3 nm, the productivity drops.

The fourth dielectric film 12 is formed for example through the sputtering method.

The reflective film 12 reflects the laser beam L irradiated onto the recording film 15 and lets the reflected laser beam outgo from the light transmissive layer 19 while effectively dissipating the heat generated on the recording film 15 by the irradiation of the laser beam L.

A material forming the reflective film 13 is not particularly limited but Mg, Al, Ti, Cr, Fe, Co, Ni, Cu, Zn, Ge, Ag, Pt, Au or Nd is used. Of these, a metal material such as an alloy including at least one of the high-reflectivity metals Al, Au, Ag and Cu or an alloy of Ag and Cu is preferably used to form the reflective film 13. In particular, in case the reflective film 13 includes Ag, the reflective film 13 excellent in the surface smoothness can be formed, thus reducing the noise level of a reproduced signal, which is preferable.

While the thickness of the reflective film 13 is not particularly limited, it is preferably 5 nm to 150 nm, and more preferably, 7 nm to 120 nm.

The reflective film 13 is formed for example through the sputtering method.

The third dielectric film 14 protects, together with the second dielectric film 16, the recording film 15 physically and chemically as well as dissipates the heat toward the reflective film 13 the heat generated on the recording film 15 by the irradiation of the laser beam L.

A material forming the third dielectric film 14 is not particularly limited but the same material forming the fourth dielectric film 12 is used. In this embodiment, the third dielectric film 14 is formed by a material including zirconium oxide as a main component, same as the fourth dielectric film 12.

The third dielectric film 14 preferably has a thickness of 3 nm to 35 nm. In case the thickness of the third dielectric film 14 is less than 3 nm, it is difficult to form the third dielectric film 14 as a continuous film. In case the thickness of the third dielectric film 14 exceeds 35 nm, it may be difficult to effectively dissipate toward the reflective film 13 the heat generated on the recording film 15.

The third dielectric film 14 is formed for example through the sputtering method.

The recording film 15 is a film to form a recording mark. The recording film 15 is formed by a phase change material and comprises a single film.

In this embodiment, the recording film 12 is formed by a phase change material including Sb, Ge and Mg as main components. In case the recording film 15 is formed by such a phase change material, the recording film 15 is excellent in the storage characteristic and the repetitive overwriting characteristic. it is possible to effectively prevent the medium linear velocity from being influenced by the loadings of Ge. Thus, according to the invention, it is possible to stably produce an optical recording medium 10 having a desired medium linear velocity.

In this invention, the atomic ratio of Sb, Ge and Mg included as main components in the phase change material preferably satisfies 70 atm %$\leqq$Sb$\leqq$95 atm %, 0 atm %<Ge<30 atm %, and 0 atm %<Mg$\leqq$25 atm %, respectively. The atomic ratio of Sb, Ge and Mg more preferably satisfies 73 atm %$\leqq$Sb$\leqq$93 atm %, 3 atm %$\leqq$Ge$\leqq$25 atm %, and 1 atm %$\leqq$Mg$\leqq$10 atm %, respectively. In this case, it is possible to further enhance the storage characteristic and the repetitive overwriting characteristic.

In this embodiment, a phase change material forming the recording film 15 may further have an element other than Sb, Ge and Mg added.

The recording film 15 is preferably formed to have a thickness of 3 nm to 25 nm. In case the thickness of the recording film 15 is less than 3 nm, it is difficult to effect phase change of the phase change material included in the recording film from the amorphous state to the crystalline state. In case the thickness of the recording film 15 exceeds 25 nm, the amount of heat required to melt the recording film increases thus requiring a high recording power and degrading the recording sensitivity.

The recording film 15 may be formed on the surface of the third dielectric film 14 through a vapor growth method using chemical species including an element constituting the recording film 15. The vapor growth method may be the vacuum deposition method or the sputtering method. The recording film 15 is preferably formed through the sputtering method.

The second dielectric film 16 protects, together with the third dielectric film 14, the recording film 15 physically and chemically as well as acts as a barrier film used to prevent an element constituting the first dielectric film 17 from being diffused into the recording film 15.

A material forming the second dielectric film 16 is not particularly limited but the same material forming the fourth dielectric film 12 is used. In this embodiment, the second dielectric film 16 is formed by a material including zirconium oxide as a main component, same as the fourth dielectric film 12 and the third dielectric film 14.

The second dielectric film 16 preferably has a thickness of 3 nm to 15 nm. In case the thickness of the second dielectric film 16 is less than 3 nm, an effect as a barrier film may be degraded. In case the thickness of the second dielectric film 16 exceeds 15 nm, the productivity may drop.

The second dielectric film 16 is formed for example through the sputtering method.

The first dielectric film 17 has a feature to enhance the adhesion between the second dielectric film 16 and the heat radiation film 18.

While a material forming a first dielectric film 17 is not particularly limited as long as it has a high light transmission property with respect to the laser beam L and shows high adhesion with the second dielectric film 16 and the heat radiation film 18, a mixture of ZnS and SiO$_2$ preferably forms the first dielectric film 17. In case the first dielectric film 17 s formed by a mixture of ZnS and SiO$_2$, the mol ratio of ZnS and SiO$_2$ is preferably 60:40 to 95:5. In case the mol ratio of ZnS is less than 60 percent, the refractive index of the first dielectric film 17 may drop thus reducing the difference in the reflectivity of a recording area 15 where a recording marks is formed and that of another recording area 15 where a recording marks is not formed. In case the mol ratio of ZnS exceeds 95 percent, it is difficult to form the first dielectric film 17 as a completely translucent film, which has an adverse effect such as a reduced signal output.

The first dielectric film 17 is preferably formed to have a thickness of 5 nm to 50 nm. In case the thickness of the first dielectric film 17 is less than 5 nm, a crack is likely to occur in the heat radiation film 18. In case the thickness of the first dielectric film 17 exceeds 50 nm, the heat radiation effect may be degraded.

The first dielectric film 17 is formed for example through the sputtering method.

The heat radiation film 18 dissipates, via the first dielectric film 17, the heat transmitted from the recording film 15.

While a material forming the heat radiation film 18 is not particularly limited as long as it can dissipate heat generated on the recording film 15, a material having a higher thermal conductivity than the first dielectric film 17, to be more precise, AlN, Al$_2$O$_3$, SiN, ZnS, ZnO or SiO$_2$ is preferably used.

The heat radiation film 18 preferably has a thickness of 20 nm to 70 nm. In case the thickness of the heat radiation film 18 is less than 20 nm, a sufficient heat radiation effect may not be obtained. In case the thickness exceeds 70 nm, it takes a long time to form the heat radiation film 18, which may reduce the productivity.

The heat radiation film 18 is formed for example through the sputtering method.

The light transmissive layer 19 is a layer transmitting the laser beam L. One surface of the light transmissive layer 19 forms a plane of incidence 19a.

A material forming the light transmissive layer 19 is requested to have small absorption and small double refraction index in the wavelength range of near infrared light to ultraviolet light. A material forming the light transmissive layer 19 is not particularly limited as long as it satisfies the above conditions although a resin compound including an ultraviolet-curing resin or electron radiation curing resin is preferably used. A resin compound including an ultraviolet-curing resin is used more preferably.

The light transmissive layer 19 is preferably formed to have a thickness of 30 μm to 200 μm.

The light transmissive layer 19 is preferably formed by applying a solution of a resin compound on the surface of the information layer 20 by way of a spin coating method. A seat formed of a light transmissive resin may be bonded on the surface of the information layer by using an adhesive in order to form the light transmissive layer 19.

In case data is recorded onto the recording film 15 of the optical recording medium 10 thus arranged according to this embodiment and the data recorded on the recording film 15 is directly overwritten, a laser beam L whose power is modulated to the writing power Pw, the erasing power Pe or the base power Pb is focused on the recording film 15 via the light transmissive layer 19.

In this embodiment, the recording film 15 includes Sb, Ge and Mg as main components. The recording film 15 formed by a phase change material where the atomic ratio of Sb, Ge and Mg satisfies 70 atm %$\leq$Sb$\leq$95 atm %, 0 atm %<Ge<30 atm %, and 0 atm %<Mg$\leq$25 atm %, respectively. In case the recording film 15 is formed by such a phase change material, it is possible to effectively prevent considerable degradation of jitter obtained when data is directly overwritten into a data-recorded area for the first time after the data recorded on the recording film 15 is stored for a prolonged time under a high temperature. When the data is repeatedly overwritten 10 times onto the recording film 15, a sufficiently small noise level and a high carrier-to-noise ratio (C/N) are obtained, thus obtaining a better jitter. In particular, even when the data is directly overwritten onto the recording film 15 1000-times repeatedly, degradation of jitter is prevented more effectively.

Thus, even in case the data recorded on the recording film 15 is stored for a prolonged time under a high temperature, data may be directly overwritten into the area where the data is recorded in a desirable fashion. Data recorded onto the recording film 15 may be directly overwritten for multiple times repeatedly in a desirable fashion.

EXAMPLES

Examples of the invention will be described in order to clarify the advantages of the invention.

Example 1

An optical recording medium sample #1 was produced as follows:

Via an injection molding method, a polycarbonate board having a thickness of 1.1 mm and a diameter of 120 mm with a groove formed at a groove pitch of 0.32 μM was produced.

Then, the polycarbonate board was set to a sputtering device. The following films were formed via the sputtering method: a fourth dielectric film including zirconium oxide as a main component and having a thickness of 5 nm; a reflective film including an alloy of Pd of 1 atm % and Cu of 1 atm % and having a thickness of 10 nm; a third dielectric film including zirconium oxide as a main component and having a thickness of 4 nm; a recording film including a phase change material including Ge of 13.9 atm % and Mg of 1.9 atm % as main component and having a thickness of 6 nm; a second dielectric film including zirconium oxide as a main component and having a thickness of 5 nm; a first dielectric film including a mixture of ZnS and $SiO_2$ and having a thickness of 10 nm; and a heat radiation film having a thickness of 40 nm. Through this process, an ii layer was formed.

The second, third and fourth dielectric films were formed via a sputtering method using a $ZrO_2$ target in an argon gas atmosphere.

The reflective film was formed via a sputtering method using an alloy target including Ag of 98 atm %, Pd of 1 atm % and Cu of 1 atm % in the argon gas atmosphere. The recording film was formed via a dual sputtering method using an SbGe alloy target and an Mg target in the argon gas atmosphere.

The first dielectric film was formed via a sputtering method using a target including as a main component a mixture of ZnS and $SiO_2$ of a mol ratio of 80:20 in the argon gas atmosphere. The heat radiation film was formed via a reactive sputtering method using an Ai target in the argon gas and nitrogen gas atmosphere.

The recording film was initialized to crystallize the recording film on a semiconductor laser having a wavelength of 810 nm operating at the output of 500 mW.

Further, a solution of an ultraviolet-curing acrylic resin compound was applied on the surface of the heat radiation film to form a coating film. Then, ultraviolet light was irradiated onto the coating film to cure the ultraviolet-curing acrylic resin compound and forming a light transmissive layer 100 μm in thickness.

The optical recording medium sample #1 was thus produced.

Then, an optical recording medium sample #2 was produced in the same way as the optical recording medium sample #1 except that a recording film was formed including a phase change material including Sb of 85.0 atm %, Ge of 13.0 atm % and Mg of 2.0 atm % and having a thickness of 6 nm.

Further, an optical recording medium sample #3 was produced in the same way as the optical recording medium sample #1 except that a recording film was formed including a phase change material including Sb of 86.1 atm %, Ge of 11.9 atm % and Mg of 2.0 atm % and having a thickness of 6 nm.

Further, an optical recording medium sample #4 was produced in the same way as the optical recording medium sample #1 except that a recording film was formed including a phase change material including Sb of 85.9 atm %, Ge of 13.1 atm % and Mg of 1.0 atm % and having a thickness of 6 nm.

Further, an optical recording medium sample #5 was produced in the same way as the optical recording medium sample #1 except that a recording film was formed including a phase change material including Sb of 84.6 atm %, Ge of 11.6 atm % and Mg of 3.8 atm % and having a thickness of 6 nm.

Further, an optical recording medium sample #6 was produced in the same way as the optical recording medium sample #1 except that a recording film was formed including a phase change material including Sb of 86.0 atm % and Ge of 14.0 atm % and having a thickness of 6 nm.

Further, an optical recording medium sample #7 was produced in the same way as the optical recording medium sample #1 except that a recording film was formed including a phase change material including In of 0.8 atm %, Sb of 71.1 atm %, Te of 16.4 atm %, Ge of 5.5 atm % and Mn of 6.2 atm % and having a thickness of 6 nm.

The optical recording medium samples #1 through #7 were set on the optical recording medium evaluation device DDU1000 (commodity name) from Pulstec Industrial Co., Ltd. While the samples were rotated at a linear velocity of 10.5 m/sec, a laser beam having a channel clock frequency of 132 MHz, a channel bit length of 0.12 μm/bit and a wavelength of 405 nm and whose power is modulated to a writing power Pw or a base power Pb in accordance with a predetermined pattern was irradiated onto the recording film via the light transmissive layer by using an objective lens having a numerical aperture NA of 0.85. Random signals of a recording mark having a length of 2T through 8T in the 1 or 7RLL modulating system were directly overwritten 10 or 1000 times respectively. Further, an 8T mark signal including only recording marks having a length of 8T in another recording area was directly overwritten 10 times.

In case the random signal and the 8T mark signal were directly overwritten to the recording films of optical recording media samples #1 through #7, the writing power Pw of the laser beam, the erasing power Pe, the regenerating power Pr, and the base power Pb were respectively set to 9.4 mW, 3.5 mW, 0.7 mW and 0.3 mW.

Next, under the above direct overwriting conditions, the jitter of a reproduced signal of each directly overwritten random signal was measured to evaluate the repetitive overwriting characteristics obtained when direct overwriting was made 10 times and 1000 times. Further, C/N and noise level of a reproduced signal of the 8T signal directly overwritten were measured to evaluate the 8T signal characteristics.

Measurement result of each sample is shown in Table 1.

The overwriting characteristics obtained when data is directly overwritten 10 or 1000 times are respectively indicated as OW01 and OW1000.

After the random signal was directly overwritten 10 times, the samples were stored for 24 hours under the environment of 80° C. and 10% RH.

Same as the above, the random signal of each sample was directly overwritten in the area where it was directly overwritten 10 times. The jitter of a reproduced signal of a newly recorded random signal was measured to evaluate the corresponding storage characteristic.

Measurement result of each sample is shown in Table 1.

TABLE 1

| | Repetitive overwriting characteristic | | 8T signal characteristics | | Storage |
|---|---|---|---|---|---|
| | OW10 (%) | OW1000 (%) | Nose (dBm) | C/N(dB) | characteristic (%) |
| Optical recording medium sample #1 | 6.5 | 7.6 | −62.0 | 55.0 | 7.9 |
| Optical recording medium sample #2 | 6.5 | 8.0 | −62.1 | 55.0 | 8.0 |
| Optical recording medium sample #3 | 6.5 | 8.4 | −61.6 | 54.2 | 8.2 |
| Optical recording medium sample #4 | 6.7 | 8.1 | −62.0 | 54.7 | 8.1 |
| Optical recording medium sample #5 | 6.7 | 8.0 | −61.9 | 54.6 | 8.2 |
| Optical recording medium sample #6 | 7.2 | 11.7 | −60.3 | 54.1 | 9.0 |
| Optical recording medium sample #7 | 9.3 | 11.2 | .60.5 | 53.1 | 13.8 |

As understood from Table 1, for the optical recording medium sample #7, the level of the 8T signal is high so that C/N is as low as 53.1 dB. As a result, the jitter obtained when direct overwriting was repeated 10 times was large. In particular, the jitter obtained when direct overwriting was repeated 10 times was also large. The jitter of a reproduced signal where storage characteristic was evaluated was considerably large. For the optical recording medium sample #6, the jitter corresponding to 10-time direct overwriting and that corresponding to evaluation of storage characteristic were small and favorable. The jitter obtained when direct overwriting was repeated 1000 times remained large.

For the optical recording medium samples #1 through #5, the noise level of the 8T signal dropped and a high carrier-to-noise ratio (C/N) of approximately 55 dB was obtained. As a result, the jitter obtained when direct overwriting was repeated 10 times was small and the jitter obtained when direct overwriting was repeated 1000 times was also small. This showed that the repetitive overwriting characteristic was improved and the jitter corresponding to the evaluation of storage characteristic was smaller than that of the optical recording medium sample #6, thus revealing further improvement of storage characteristic.

Thus, for the optical recording medium samples #1 through #5, it is possible to further improve the carrier-to-noise ratio (C/N) by reducing the noise of a reproduced signal. When direct overwriting is repeated 10 times in an area where data was recorded in the recording film of each sample, degradation of the jitter of the reproduced signal is more effectively prevented. Moreover, when direct overwriting is repeated 1000 times in an area where data was recorded in the recording film of each sample, degradation of the jitter of the reproduced signal is more effectively prevented. This shows that the repetitive overwriting characteristic is further improved. Thus, it is possible to directly overwrite the data recorded on each sample multiple times repeatedly as desired.

For the optical recording medium samples #1 through #6, it is possible to effectively prevent considerable worsening of jitter obtained when data is directly overwritten into a data-recorded area for the first time after the data recorded on each sample is stored for a prolonged time under a high temperature. This shows excellent storage characteristics of the optical recording medium samples #1 through #6 and especially of the optical recording medium samples #1 through #5. It is thus possible to directly overwrite data in a data-recorded area in the recording film of each sample as desired.

The invention is not limited to the foregoing embodiments but various changes to the invention are possible within the scope of the invention described in the claims. It is to be understood that such modifications are within the scope of the invention.

For example, in the embodiment, the information layer 20 of the optical recording medium 10 comprises the fourth dielectric film 12, the reflective film 13, the third dielectric film 14, the recording film 15, the second dielectric film 16, the first dielectric film 17 and the hat radiation film 18 laminated one on the other. So long as the information layer of the optical recording medium includes a recording film formed by a phase change material including at least Sb, Ge and Mg as main component, the remaining arrangement is not particularly limited. For example, the information layer may comprise a fourth dielectric film, a reflective film, a third dielectric film, a recording film, a second dielectric film and a first dielectric film laminated in this order from the support board. Or, the information layer may comprise a reflective film, a second dielectric film, a recording film, a first dielectric film and a heat radiation film laminated in this order from the support board.

While each of the fourth dielectric film 12, the third dielectric film 14, the second dielectric film 16 and the first dielectric film 17 comprises a single film, it is not always required that the fourth dielectric film 12, the third dielectric film 14, the second dielectric film 16 and the first dielectric film 17 each comprise a single film. At least one of the fourth dielectric film 12, the third dielectric film 14, the second dielectric film 16 and the first dielectric film 17 may comprise two or more films laminated together.

While the optical recording medium 10 comprises the support board 11, the light transmissive layer 19 and the single information layer 20 provided between the support board 11 and the light transmissive layer 19, it is not always required that an optical recording medium comprise a single information layer. Instead, an optical recording medium of the invention may comprise two or more information layers. In case the optical recording medium comprises two or more information layers, all information layers need not include a recording film formed by a phase change material at least including Sb, Ge and Mg as main components. Rather, it is required that at least one information layer include a recording film formed by a phase change material at least including Sb, Ge and Mg as main components.

Further, the optical recording medium 10 comprises a light transmissive layer 19 so that the laser beam L is irradiated onto the recording film 15 via the light transmissive layer 19 in the embodiment, it is not always required that the laser beam L be irradiated onto the recording film 15 via the light transmissive layer 19. The optical recording medium may comprise a support board formed by a light transmissive material and the laser beam may be irradiated onto the recording film via the support board.

What is claimed is:

1. An optical recording medium comprising at least one information layer comprising a recording film, wherein said recording film is formed by a phase change material comprising at least Sb, Ge and Mg as main components, wherein the amount of Ge in said phase change material satisfies the following relationship:

$$11.6 \text{ atm \%} \leq Ge \leq 13.9 \text{ atm \%}.$$

2. The optical recording medium according to claim 1, wherein the atomic ratio of Sb, Ge and Mg included as main components in said phase change material satisfies 70 atm $\% \leq Sb \leq 95$ atm %, and 0 atm $\% < Mg \leq 25$ atm %.

3. The optical recording medium according to claim 1, wherein the atomic ratio of Sb, Ge and Mg included as main components in said phase change material satisfies 73 atm $\% \leq Sb \leq 93$ atm %, and 1 atm $\% \leq Mg \leq 10$ atm %.

4. The optical recording medium according to claim 1, wherein the atomic ratio of Ge included in said phase change material satisfies 11.6 atm $\% \leq Ge \leq 13.1$ atm %.

5. The optical recording medium according to claim 2, wherein the atomic ratio of Ge included in said phase change material satisfies 11.6 atm $\% \leq Ge \leq 13.1$ atm %.

6. The optical recording medium according to claim 3, wherein the atomic ratio of Ge included in said phase change material satisfies 11.6 atm $\% \leq Ge \leq 13.1$ atm %.

7. The optical recording medium according to claim 1, wherein the optical recording medium is arranged as a rewritable optical recording medium and comprises:

a support board; a fourth dielectric film formed on the surface of the support board; a reflective film formed on the surface of the fourth dielectric film; a third dielectric film formed on the surface of the reflective film; said recording film formed on the surface of the third dielectric film; a second dielectric film formed on the surface of the recording film; a first dielectric film formed on the surface of the second dielectric film; a heat radiation film formed on the surface of the first dielectric film; and a light transmissive layer formed on the surface of the heat radiation film.

8. The optical recording medium according to claim 7, wherein a groove is present in the surface of the support board.

9. The optical recording medium according to claim 1, wherein the recording film has a thickness of 3 nm to 25 nm.

10. The optical recording medium according to claim 7, wherein a groove is present in the surface of the support board and the recording film has a thickness of 3 nm to 25 nm.

11. The optical recording medium according to claim 10, wherein the atomic ratio of Sb, Ge and Mg included as main components in said phase change material satisfies 70 atm $\% \leq Sb \leq 95$ atm % and 0 atm $\% < Mg \leq 25$ atm %.

12. The optical recording medium according to claim 10, wherein the atomic ratio of Sb, Ge and Mg included as main components in said phase change material satisfies 73 atm $\% \leq Sb \leq 93$ atm % and 1 atm $\% \leq Mg \leq 10$ atm %.

13. The optical recording medium according to claim 11, wherein the atomic ratio of Ge included in said phase change material satisfies 11.6 atm $\% \leq Ge \leq 13.1$ atm %.

14. The optical recording medium according to claim 12, wherein the atomic ratio of Ge included in said phase change material satisfies 11.6 atm $\% \leq Ge \leq 13.1$ atm %.

* * * * *